United States Patent [19]

Shimaoka et al.

[11] Patent Number: 5,179,152
[45] Date of Patent: Jan. 12, 1993

[54] FIBER-REINFORCED RESIN COMPOSITION HAVING SURFACE SMOOTHNESS

[75] Inventors: Goro Shimaoka; Makoto Mizutani; Isamu Mio; Kunitoshi Mimura, all of Kanagawa, Japan

[73] Assignee: Mitsubishi Gas Chemical Co., Inc., Tokyo, Japan

[21] Appl. No.: 718,033

[22] Filed: Jun. 20, 1991

[30] Foreign Application Priority Data

Jun. 21, 1990 [JP] Japan .................. 2-161237

[51] Int. Cl.$^5$ .......................... C08J 5/08; C08L 69/00
[52] U.S. Cl. ........................... 524/494; 523/214; 524/222
[58] Field of Search ............... 523/214; 524/222, 494

[56] References Cited

FOREIGN PATENT DOCUMENTS

| | | |
|---|---|---|
| 0370512 | 5/1990 | European Pat. Off. ............ 524/494 |
| 61-241355 | 10/1986 | Japan .................. 524/494 |
| 1-096245 | 4/1989 | Japan .................. 524/494 |

Primary Examiner—Paul R. Michel
Assistant Examiner—LaVonda R. DeWitt
Attorney, Agent, or Firm—Sughrue, Mion, Zinn, Macpeak & Seas

[57] ABSTRACT

A fiber-reinforced resin composition having surface smoothness, which comprises (1) 100 parts by weight of a thermoplastic resin composition comprising an aromatic polycarbonate resin and a thermoplastic polyester resin in a weight ratio of from 10/90 to 90/10, (2) from 50 to 100 parts by weight of glass fiber sheet chips having an almost rectangular shape, each side having a length of from 1 to 30 mm, the glass fiber sheet chips being obtained by forming E-glass fibers having an average fiber diameter of 2 μm or less which have been surface-treated with a silane coupling agent, into a sheet by a paper making process and then cutting the resulting sheet, and (3) from 0 to 40 parts by weight of a thermoplastic elastomeric polymer, and an exterior automotive part showing excellent image clarity, obtained by shaping the fiber-reinforced resin composition.

9 Claims, No Drawings

FIBER-REINFORCED RESIN COMPOSITION HAVING SURFACE SMOOTHNESS

FIELD OF THE INVENTION

The present invention relates to a fiber-reinforced thermoplastic resin composition having excellent surface smoothness, which is based on a combination of an aromatic polycarbonate resin and a thermoplastic polyester resin. The composition is particularly suitable for use in producing exterior automotive parts required to have a high image clarity after coating.

BACKGROUND OF THE INVENTION

Since aromatic polycarbonate resins are tough resins having not only excellent impact resistance and electrical properties but also good dimensional stability, they are being utilized as a useful engineering plastic. However, the resins are defective, for example, in that they have poor moldability due to the high melt viscosity and their solvent resistance is so poor that contact with aromatic solvents or gasoline causes the resins to develop cracks. These defects have restricted the application range for the aromatic polycarbonate resins.

In order to improve such insufficient properties, it has been proposed to add various kinds of resins to aromatic polycarbonate resins. For example, JP-B-36-14035 (the term "JP-B" as used herein means an "examined Japanese patent publication") proposes addition of poly(ethylene terephthalate) to improve moldability (flowability) and solvent resistance, and U.S. Pat. No. 3,218,372 proposes addition of a poly(alkylene terephthalate) for the same purpose. In this method in which the poly(alkylene terephthalate) is added to improve solvent resistance, the larger the amount of the poly(alkylene terephthalate) added, the more the solvent resistance is improved. However, the increased amount of poly(alkylene terephthalate) results in molded articles which not only tend to have sink marks, etc., but also have poor impact resistance and heat resistance.

It has been proposed to further add a thermoplastic elastomeric polymer to improve impact resistance (e.g., JP-B-55-9435, JP-B-62-37671). Known as such elastomeric polymers are methyl methacrylate-butadiene-styrene copolymer (MBS), methyl methacrylate-acrylate-styrene copolymer (MAS), methyl methacrylate-acrylate-butadiene-styrene copolymer (MABS), acrylic ester-based core-shell copolymers, polyester elastomers, and other elastomers.

Further, for the purpose of improving heat resistance, preventing sink mark occurrence, lowering coefficient of linear expansion, and improving strength and stiffness, it has also been attempted to add glass fibers, carbon fibers, and other various kinds of inorganic fillers or reinforcements.

As a result of the improvements described above, compositions comprising an aromatic polycarbonate resin, a thermoplastic polyester resin, a thermoplastic elastomeric polymer, and a reinforcement are being extensively used in exterior automotive parts such as door handles, side moldings, wheel covers, fender panels, and garnishes, because the compositions have excellent solvent resistance, impact resistance, strength, and stiffness and have low coefficient of linear expansion.

However, these compositions have had a problem that they are insufficient in surface appearance, particularly surface smoothness, so that they are poor in image clarity after coating. Although fibrous reinforcements such as glass fibers and carbon fibers are especially useful for improving strength and stiffness and lowering coefficient of linear expansion and, particularly, the glass fibers are widely used as such a reinforcement because of their low cost, use of the conventional glass fibers has been disadvantageous in that the glass fiber-reinforced compositions have poor surface smoothness and, hence, satisfactory image clarity cannot be obtained.

SUMMARY OF THE INVENTION

The present inventors made extensive studies to eliminate the above-described problem. As one of such studies, use of ultrafine glass fibers having an average fiber diameter of 2 $\mu$m or less was tried, but it was found that since such ultrafine glass fibers are ordinarily obtained in a cotton-like form, they cannot be uniformly mixed with a resin composition containing an aromatic polycarbonate resin and a thermoplastic polyester resin, causing separation or blocking when the glass fibers are fed to an extruder, and such glass fibers are, hence, not suitable for practical use. It was also found that according to materials of the glass, etc., glass fibers deteriorate the resin or show insufficient adhesion to the resin. Furthermore, it has now been found that by forming specific glass fibers having an average fiber diameter of 2 $\mu$m or less into a sheet by a paper making process and cutting the resulting sheet into sheet chips having an almost rectangular shape in which each side has a length of from 1 to 30 mm, and adding the sheet chips to a composition comprising an aromatic polycarbonate resin and a thermoplastic polyester resin, the glass fibers are uniformly mixed with the composition and undergo no separation when fed to the extruder, and the resulting composition can give shaped articles having excellent surface appearance, particularly surface smoothness and high image clarity after coating. The present invention has been completed based on these findings.

Accordingly, an object of the present invention is to provide a resin composition which is obtained by adding specific glass fiber sheet chips to a resin composition comprising an aromatic polycarbonate resin and a thermoplastic polyester resin, and which gives shaped articles having excellent solvent resistance, mechanical strength, and thermal stability, a low coefficient of linear expansion, and excellent surface appearance, particularly surface smoothness and high image clarity after coating.

Another object of the present invention is to provide a resin composition for exterior automotive parts which gives shaped articles having excellent solvent resistance, mechanical strength, and thermal stability, a low coefficient of linear expansion, and excellent surface appearance, particularly surface smoothness and high image clarity after coating.

Still another object of the present invention is to provide an exterior automotive part having excellent image clarity after coating which is obtained by shaping the above resin composition.

The fiber-reinforced resin composition having surface smoothness in accordance with the present invention comprises (1) 100 parts by weight of a thermoplastic resin composition comprising an aromatic polycarbonate resin and a thermoplastic polyester resin in a weight ratio of from 10/90 to 90/10, (2) from 5 to 100 parts by weight of glass fiber chips having an almost rectangular shape, each side thereof having a length of from 1 to 30 mm, the glass fiber chips being obtained by forming E-glass-made glass fibers having an average fiber diameter of 2 μm or less which have been surface-treated with a silane coupling agent into a sheet by a paper making process and then cutting the resulting sheet, and (3) from 0 to 40 parts by weight of a thermoplastic elastomeric polymer.

DETAILED DESCRIPTION OF THE INVENTION

The term "paper making" used herein means to indicate a manner of preparing a glass fiber sheet by forming glass fibers into a sheet by a paper making process.

The present invention uses glass fiber sheet chips having an almost rectangular shape, each side thereof having a length of from 1 to 30 mm, which are obtained by forming E-glass-made glass fibers having an average fiber diameter of 2 μm or less which have been surface-treated with a silane coupling agent into a sheet by a paper making process and then cutting the resulting sheet.

It is usually difficult to produce glass fibers having an average fiber diameter of 2 μm or less for use in the present invention by long-fiber spinning methods. Such glass fibers are generally produced by the short-fiber flame method, in which a glass which has been melted by means of a glass-melting furnace is drawn in the form of filaments having a desired uniform diameter from holes of a perforated plate and the filaments are changed into fibers by leading them into the flame of a high-temperature high-speed burner, thereby obtaining cotton-like ultrafine glass fibers. The average fiber diameter of the thus-produced glass fibers is as small as 2 μm or less, so that the specific surface area thereof is large.

The glass used for producing such glass fibers is E-glass. If other glasses such as C-glass are used to produce glass fibers and the glass fibers are added to a resin, the deterioration and decomposition of the resin are accelerated by the glass fibers, causing the resulting composition to have impaired physical properties. Specific examples of the E-glass fibers having an average fiber diameter of 2 μm or less which can be used in the present invention include E-FMW-800 (average fiber diameter 0.8 μm) and E-FMW-1700 (average fiber diameter 0.6 μm) manufactured by Nippon Muki Co., Ltd., Japan.

Such glass fibers are surface-treated with a silane coupling agent before use for producing the resin composition of the present invention. Examples of the silane coupling agent include γ-glycidoxypropyltrimethoxysilane, β-(3,4-epoxycyclohexyl)ethyltrimethoxysilane, vinyltriethoxysilane, vinyltris(2-methoxyethoxy)silane, γ-methacryloxypropyltrimethoxysilane, γ-aminopropyltrimethoxysilane, N-β-(aminoethyl)-γ-aminopropyltrimethoxysilane, N-β-(aminoethyl)-γ-aminopropylmethyldimethoxysilane, γ-mercaptopropyltrimethoxysilane, γ-chloropropyltrimethoxysilane, and the like.

The surface treatment can, for example, be carried out by a method in which glass fibers are dipped in a 0.01–1 wt % aqueous solution or dispersion of a silane coupling agent as described above and the resulting glass fibers are heat-treated at a temperature of 140° to 160° C. for 1 to 2 hours. If the surface treatment with a silane coupling agent is omitted, the desired properties cannot be obtained.

In producing the composition of the present invention, the surface-treated ultrafine glass fibers are formed into a sheet by a paper making process and this sheet is then cut before use. The sheet can be obtained by paper-making the glass fibers by the conventional long screen method, circular screen method, or the like. Paper making on neutral conditions is rather preferred than paper making on acidic conditions. Since the sheet is not particularly limited in appearance, the paper making is extremely easy. Care should, however, be taken in paper making not to considerably reduce the glass fiber length through fiber breaking, etc.

The sheet generally has a basis weight of from 50 to 500 g/m$^2$ and a thickness of from 0.5 to 3.0 mm. If either or both of the basis weight and thickness of the sheet are outside the above ranges, sheet chips obtained by cutting the sheet are fibrillated into fibers before being fed to an extruder, so that flowability is impaired and uniform mixing of a predetermined amount of the sheet chips with resins cannot be attained. The sheet produced is cut, before use, into the sheet chips having an almost rectangular shape, each side having a length of from 1 to 30 mm. If the length of each side of the sheet chips is less than 1 mm, the sheet chips are splitted into individual filaments before the glass fibers constituting the sheet chips are uniformly dispersed into resins, so that uniform mixing cannot be attained. On the other hand, if the length thereof exceeds 30 mm, the sheet chips are so large that the chips cannot be uniformly dispersed into resins or feeding of the chips to an extruder results in troubles such as separation. The glass sheet chips of an almost rectangular shape in which each side has a length of from 1 to 30 mm are normally prepared by cutting the sheet with, for example, a rectangular-cut pelletizer or the like. The thus-obtained glass sheet chips (2) generally have a width-to-length ratio of from 1:3 to 1:1, preferably approximately 1:1, from the standpoints of flowability and workability.

The aromatic polycarbonate resin used in the composition of the present invention is produced by a conventional method for producing an aromatic polycarbonate resin, that is, by reacting a dihydric phenol compound with phosgene or a carbonic acid diester in the presence of a chain terminator. This aromatic polycarbonate resin is a thermoplastic polymer having a viscosity-average molecular weight of 15,000 or more, preferably from 20,000 to 35,000.

Examples of the dihydric phenol compound include bis(4-hydroxyphenyl)methane, bis(4-hydroxyphenyl) ether, bis(4-hydroxyphenyl) sulfone, bis(4-hydroxyphenyl) sulfoxide, bis(4-hydroxyphenyl) sulfide, bis(4-hydroxyphenyl) ketone, 1,1-bis(4-hydroxyphenyl)ethane, 2,2-bis(4-hydroxyphenyl)propane [=bisphenol A], 2,2-bis(4-hydroxyphenyl)butane, 1,1-bis(4-hydroxyphenyl)cyclohexane, 2,2-bis(4-hydroxy-3,5-dimethylphenyl)propane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 1,1-bis(4-hydroxyphenyl)-1-phenylethane, and bis(4-hydroxyphenyl)diphenylmethane. Of these, 2,2-bis(4-hydroxyphenyl)propane [=bisphenol A] is preferred.

Examples of the chain terminator include conventional chain terminators such as phenol, m- or p-methylphenol, m- or p-propylphenol, p-bromophenol, p-tertbutylphenol, and tribromophenol; fatty acids such as acetic acid, propionic acid, butyric acid, capric acid, octylic acid, lauric acid, and stearic acid; fatty acid chlorides such as acetyl chloride, propionyl chloride, butyryl chloride, caproyl chloride, octylryl chloride, lauroyl chloride, and stearoyl chloride; alkyl esters of hydroxybenzoic acid such as methyl hydroxybenzoate, ethyl hydroxybenzoate, propyl hydroxybenzoate, butyl hydroxybenzoate, octyl hydroxybenzoate, nonyl hydroxybenzoate, and stearyl hydroxybenzoate; (long-chain alkyl)phenols such as octylphenol, nonylphenol, laurylphenol, palmitylphenol, and stearylphenol; alkyl esters of hydroxyphenylacetic acid such as methyl p-hydroxyphenylacetate and ethyl p-hydroxyphenylacetate; long-chain alkyl ether phenols such as octyl ether phenol, nonyl ether phenol, lauryl ether phenol, palmityl ether phenol, octadecyloxyphenol, and dodecyloxyphenol; and the like. The chain terminator is used in an amount of from 10 to 0.5 mol, preferably from 7 to 2 mol, per 100 mol of the dihydric phenol compound used. Two or more compounds may, of course, be used in combination as the chain terminator.

Along with the chain terminator, a branching agent can also be used for producing a branched polycarbonate, in an amount of from 0.01 to 3 mol %, preferably from 0.1 to 1.0 mol %, per 100 mol of the dihydric phenol compound used. Examples of the branching agent include polyhydroxy compounds such as phloroglucinol, 2,6-dimethyl-2,4,6-tri(4-hydroxyphenyl)heptene-3, 4,6-dimethyl-2,4,6-tri(4-hydroxyphenyl)heptene-2, 4,6-dimethyl-2,4,6-tri(4-hydroxyphenyl)heptane, 1,3,5-tri(2-hydroxyphenyl)benzole, 1,1,1-tri(4-hydroxyphenyl)ethane, 2,6-bis(2-hydroxy-5-methylbenzyl)-4-methylphenol, α,α',α''-tri(4-hydroxylphenyl)-1,3,5-triisopropylbenzene, and the like, and further include 3,3-bis(4-hydroxyaryl)oxindole [=isatin bisphenol], 5-chloroisatin bisphenol, 5,7-dichloroisatin bisphenol, 5-bromoisatin bisphenol, and the like.

The thermoplastic polyester resin used in the composition of the present invention is a polymer obtained by reacting an aromatic dicarboxylic acid or a diester thereof with a glycol or an alkylene oxide by a conventional method. Specific examples of the thermoplastic polyester resin include poly(ethylene terephthalate), poly(tetramethylene terephthalate) [poly(butylene terephthalate)], poly(ethylene naphthalate), poly(tetramethylene naphthalate) [poly(butylene naphthalate)], and the like, which are obtained by reacting terephthalic acid, dimethyl terephthalate, naphthalenedicarboxylic acid, or dimethyl naphthalenedicarboxylate, as the major aromatic dicarboxylic acid ingredient, with ethylene glycol, butanediol, cyclohexanedimethanol, ethylene oxide, or the like. The thermoplastic polyester resin can be a copolymer such as a copolymer of cyclohexanedimethanol with terephthalic acid and isophthalic acid, a copolymer of cyclohexanedimethanol and ethylene glycol with terephthalic acid, and the like.

The thermoplastic polyester resin used in the resin composition of the present invention generally has an intrinsic viscosity (limiting viscosity number) of 0.4 or more, preferably from 0.5 to 1.5. This intrinsic viscosity is measured at 30° C. in a mixed solvent which is a 6:4 by weight mixture of phenol and tetrachloroethane. If the intrinsic viscosity of the thermoplastic polyester resin is below 0.4, the final composition cannot have sufficiently improved impact strength and chemical resistance.

It is preferred to add a thermoplastic elastomeric polymer (3) to the composition of the present invention for the purpose of improving impact resistance and other properties. Such a thermoplastic elastomeric polymer is a resin showing rubber-like elasticity at ordinary temperature. As this elastomeric polymer (3), polymers known as impact resistance improvers or the like for aromatic polycarbonate resins and other resins can be used. The thermoplastic elastomeric polymer (3) is at least one member selected from the group consisting of an olefin-based copolymer, a polyester elastomer, a polyurethane elastomer, a polyamide elastomer, a styrene/diene block copolymer, an MBS, an MAS, and an acrylic ester-based core-shell graft copolymer.

In the thermoplastic resin composition (1) contained in the fiber-reinforced resin composition having surface smoothness according to the present invention, the proportion of the amount of the aromatic polycarbonate resin to that of the thermoplastic polyester resin is suitably selected from the range of from 10/90 to 90/10, preferably from 40/60 to 80/20, in terms of the weight. To this thermoplastic resin composition (1), the glass sheet chips having an almost rectangular shape with each side having a length of 1 to 30 mm and which are obtained by forming glass fibers with an average fiber diameter of 2 μm or less into a sheet by a paper making process and cutting the sheet, is added in an amount of from 5 to 100, preferably from 10 to 70, parts by weight per 100 parts by weight of the composition (1) and, further, the thermoplastic elastomeric polymer (3) is added in an amount of from 0 to 40, preferably from 2 to 20, parts by weight per 100 parts by weight of the composition (1).

If the content of the aromatic polycarbonate resin in the thermoplastic resin composition (1) is below 10% by weight, the final fiber-reinforced composition has poor heat resistance, dimensional stability, etc., while contents thereof exceeding 90% by weight result in insufficient improvements in moldability and solvent resistance. If the amount of the glass sheet chips (2) added to 100 parts by weight of the thermoplastic resin composition (1) is below 5 parts by weight, the effect of improving strength, stiffness, and coefficient of linear expansion is insufficient, while amounts thereof exceeding 100 parts by weight result in final compositions having poor flowability and impaired surface appearance. In the case of adding the thermoplastic elastomeric polymer (3), it is preferably used in an amount of from 2 to 40 parts by weight per 100 parts by weight of the composition (1) because the amounts thereof added below 2 parts by weight bring about almost no effect of improving impact resistance, while amounts thereof exceeding 40 parts by weight result in impaired strength, stiffness, and heat resistance.

Conventionally known various kinds of additives for aromatic polycarbonate resins or compositions comprising an aromatic polycarbonate resin and a thermoplastic polyester resin can be added, if required and necessary, to the above-described fiber-reinforced resin composition having surface smoothness according to the present invention. Such additives include reinforcements, fillers, stabilizers, ultraviolet absorbers, antistatic agents, lubricants, release agents, dyes, pigments, flame retardants, etc. For example, particularly preferred stabilizers are phosphorous acid and phosphites. Examples of release agents include esters of saturated fatty acids with mono- or polyhydric alcohols, and preferred of these are stearyl stearate, behenyl behenate, pentaerythritol tetrastearate, dipentaerythritol hexaoctoate, and the like. Examples of fillers or reinforcements, which may be organic or inorganic, include glass powder, glass beads, synthetic mica, fluorinated mica, zinc oxide, carbon fibers, zinc oxide whiskers, stainless-steel whiskers, Kevlar fibers, and the like. Further, it is, of course, advantageous according to purposes to suitably use resins such as a polyester carbonate, polyarylate, etc.

The resin composition according to the present invention is reinforced with glass fibers which have been uniformly mixed with resins without undergoing separation when being fed to an extruder. The fiber-reinforced resin composition of the present invention gives shaped articles having excellent mechanical strength and organic solvent resistance, a low coefficient of linear expansion, and excellent surface smoothness and high image clarity after coating. Therefore, the composition of the present invention is advantageously used for producing exterior automotive parts such as door handles, side moldings, wheel covers, fender panels, garnishes, bumpers, etc.

The present invention will be explained below in more detail by reference to the following Examples and Comparative Examples, but the Examples should not be construed as limiting the scope of the invention. In these examples, all parts and percents are by weight unless otherwise indicated.

EXAMPLES 1 TO 6

According to the formulations shown in Table 1, the following ingredients were mixed, extruded, and pelletized using an extruder: an aromatic polycarbonate resin produced from bisphenol A (trade name Iupilon E-2000, manufactured by Mitsubishi Gas Chemical Company, Inc., Japan; hereinafter referred to as "PC"); poly(ethylene terephthalate) (trade name Unipet 543CA, manufactured by Nippon Unipet Co., Ltd., Japan; hereinafter referred to as "PET"); poly(butylene terephthalate) (trade name Duranex 2002, manufactured by Polyplastics Co., Ltd., Japan; hereinafter referred to as "PBT"); 3 mm×3 mm glass fiber sheet chips (hereinafter referred to as "GF-A") which had been obtained by forming aminosilane-treated E-glass fibers having an average fiber diameter of 0.8 μm and a fiber length of 5-50 mm (E-FMW-800, manufactured by Nippon Muki Co., Ltd., Japan) into a sheet having a basis weight of 240 g/m² and a thickness of 2 mm by a paper making process, and cutting this sheet with a rectangular-cut pelletizer; and an MABS (Metablen W-800, manufactured by Mitsubishi Rayon Co., Ltd., Japan; hereinafter referred to as "MABS") as a thermoplastic elastomeric polymer. The pellets thus obtained were dried at 110° C. for 5 hours or more in a hot-air drying oven, and then formed into test pieces by injection molding. The test pieces were subjected to measurements of various properties.

The results obtained are shown in the Table.

The measured properties shown in the Table are as follows.

$\sigma_T$: Tensile strength, unit kg/cm² (ASTM D638)
$\sigma_F$: Flexural strength, unit kg/cm² (ASTM D790)
$Y_F$: Flexural modulus, unit x10³ kg/cm², test piece thickness ⅛" (ASTM D790)
I.Z.: Izod impact strength with 0.25R notch, unit kg·cm/cm, test piece thickness ⅛"(ASTM D256)
DTUL: Deflection Temperature Under Load, load 18.6 kg/cm² (ASTM D648)
L: Mean value between coefficient of linear expansion for the flow direction and that for the cross-flow direction (unit×10⁻⁵ cm/cm/°C.) (25° C.→80° C.)
Surface smoothness (unit μm) (measured using Surfcom 554A manufactured by Tokyo Seimitsu Co.)
$R_a$: Center-line average roughness
$R_{max}$: Maximum height
$R_z$: Average of ten roughness values
Image clarity: Surface appearance after coating was visually examined and evaluated in five grades, with rating 5 being the best in the property and rating 1 being the worst.

COMPARATIVE EXAMPLE 1

The same procedures as in Example 1 were repeated except that aminosilane-treated E-glass fibers having a fiber diameter of 0.8 μm and an average fiber length of 5-50 mm (E-FMW-800, manufactured by Nippon Muki Co., Ltd.) in a cotton-like form were used directly in place of GF-A. As a result, the cotton-like glass fibers were interwound with one another to form a block in the hopper of the extruder, so that extrusion was impossible.

COMPARATIVE EXAMPLES 2 TO 5

The same procedures as in Example 1 were repeated except that aminosilane-treated E-glass fibers having an average fiber diameter of 6 μm and an average fiber length of 3 mm (ECS03T-531 DE, manufactured by Nippon Electric Glass Co., Ltd., Japan; hereinafter referred to as "GF-B") were used in place of GF-A. The results obtained are shown in the Table.

COMPARATIVE EXAMPLE 6

The same procedures as in Example 1 were repeated except that C-glass fibers having an average fiber diameter of 0.8 μm and a fiber length of 5-50 mm (hereinafter referred to as "GF-C") were used in place of the E-glass fibers. The results obtained are shown in the Table.

COMPARATIVE EXAMPLE 7

The same procedures as in Example 1 were repeated except that glass fibers having an average fiber diameter of 0.8 μm and a fiber length of 5-50 mm which had not undergone aminosilane treatment (hereinafter referred to as "GF-D") were used in place of GF-A. The results obtained are shown in the Table.

TABLE

|  | Example | | | | | |
| --- | --- | --- | --- | --- | --- | --- |
|  | 1 | 2 | 3 | 4 | 5 | 6 |
| Formulation (parts) | | | | | | |
| .PC | 68 | 68 | 68 | 68 | 56 | 40 |
| .PET | 22 | 22 |  | 17 |  |  |
| .PBT |  |  | 22 | 5 | 24 | 45 |
| .GF-A | 10 | 10 | 10 | 10 | 20 | 15 |

TABLE-continued

| | | | | | | |
|---|---|---|---|---|---|---|
| .GF-B | | | | | | |
| .GF-C | | | | | | |
| .GF-D | | | | | | |
| .MABS | | | 5 | | | |
| $\sigma_T$ (kg/cm$^2$) | 850 | 800 | 900 | 870 | 1180 | 1100 |
| $\sigma_F$ (kg/cm$^2$) | 1350 | 1300 | 1400 | 1350 | 1880 | 1620 |
| $Y_F$ (×10$^3$ kg/cm$^2$) | 38.0 | 35.0 | 37.0 | 36.8 | 62.5 | 40.2 |
| I.Z. (kg · cm/cm) | 8 | 12 | 7 | 7 | 9 | 7 |
| DTUL (°C.) | 140 | 135 | 126 | 132 | 127 | 126 |
| L (×10$^{-5}$ · cm/cm/°C.) | 3.7 | 3.8 | 3.5 | 3.6 | 2.5 | 3.3 |
| Ra (μm) | 0.59 | 0.61 | 0.35 | 0.45 | 0.48 | 0.40 |
| Rmax (μm) | 6.25 | 6.30 | 6.00 | 5.95 | 6.10 | 6.01 |
| Rz (μm) | 4.95 | 5.01 | 4.54 | 4.62 | 4.90 | 4.70 |
| Image clarity | 4 | 4 | 5 | 4 | 4 | 4 |

| | Comparative Example | | | | | |
|---|---|---|---|---|---|---|
| | 2 | 3 | 4 | 5 | 6 | 7 |
| Formulation (parts) | | | | | | |
| .PC | 68 | 68 | 56 | 40 | 68 | 68 |
| .PET | 22 | | | | 22 | 22 |
| .PBT | | 22 | 24 | 45 | | |
| .GF-A | | | | | | |
| .GF-B | 10 | 10 | 20 | 15 | | |
| .GF-C | | | | | 10 | |
| .GF-D | | | | | | 10 |
| .MABS | | | | | | |
| $\sigma_T$ (kg/cm$^2$) | 890 | 920 | 1210 | 1120 | 760 | 790 |
| $\sigma_F$ (kg/cm$^2$) | 1400 | 1420 | 1920 | 1680 | 1030 | 1200 |
| $Y_F$ (×10$^3$ kg/cm$^2$) | 39.2 | 37.4 | 64.4 | 41.2 | 39.0 | 38.5 |
| I.Z. (kg · cm/cm) | 8 | 7 | 10 | 7 | 4 | 7 |
| DTUL (°C.) | 143 | 128 | 129 | 128 | 135 | 140 |
| L (×10$^{-5}$ · cm/cm/°C.) | 3.7 | 3.6 | 2.6 | 3.4 | 3.6 | 3.7 |
| Ra (μm) | 0.73 | 0.68 | 0.95 | 0.82 | 0.55 | 0.62 |
| Rmax (μm) | 9.05 | 8.05 | 12.9 | 9.52 | 6.27 | 7.34 |
| Rz (μm) | 7.31 | 6.15 | 10.8 | 8.35 | 5.01 | 5.53 |
| Image clarity | 2 | 3 | 1 | 2 | 4 | 4 |

While the invention has been described in detail and with reference to specific embodiments thereof, it will be apparent to one skilled in the art that various changes and modifications can be made therein without departing from the spirit and scope thereof.

What is claimed is:

1. A fiber-reinforced resin composition having surface smoothness, which comprises
   (1) 100 parts by weight of a thermoplastic resin composition comprising an aromatic polycarbonate resin and a thermoplastic polyester resin which is at least one member selected from the group consisting of poly(ethylene terephthalate), poly(butylene terephthalate), poly(ethylene naphthalate) and poly(butylene naphthalate) in a weight ratio of from 10/90 to 90/10,
   (2) from 5 to 100 parts by weight of glass fiber sheet chips having an almost rectangular shape, each side having a length of from 1 to 30 mm, the glass fiber sheet chips being obtained by forming E-glass fibers having an average fiber diameter of 2 μm or less which have been surface-treated with a silane coupling agent, into a sheet by a paper making process and then cutting the resulting sheet, and
   (3) from 0 to 40 parts by weight of a thermoplastic elastomeric polymer which is at least one member selected from the group consisting of an olefin-based copolymer, a polyurethane elastomer, a polyamide elastomer, a styrene/diene block copolymer, a methyl methacrylate-butadiene-styrene copolymer, a methyl methacrylate-acrylate-styrene copolymer, and an acrylic ester-based core-shell graft copolymer.

2. A fiber-reinforced resin composition as claimed in claim 1, wherein the glass fiber sheet has a basis weight of from 50 to 500 g/m$^2$ and a thickness of from 0.5 to 3.0 mm.

3. A fiber-reinforced resin composition as claimed in claim 1, wherein the glass fiber sheet is obtained by a paper making on neutral conditions.

4. A fiber-reinforced resin composition as claimed in claim 1, wherein the glass fiber sheet chips having an almost rectangular shape, each side having a length of from 1 to 30 mm, obtained by cutting the sheet has a width-to-length ratio of from 1:3 to 1:1.

5. A fiber-reinforced resin composition as claimed in claim 1, wherein said E-glass fibers having an average fiber diameter of 2 μm or less are fibers obtained by the short-fiber flame method.

6. A fiber-reinforced resin composition as claimed in claim 1, wherein the amount of the glass fiber sheet chips (2) is from 10 to 70 parts by weight per 100 parts by weight of the thermoplastic resin composition (1).

7. A fiber-reinforced resin composition as claimed in claim 1, wherein the amount of said thermoplastic elastomeric polymer (3) is from 2 to 20 parts by weight per 100 parts by weight of the thermoplastic resin composition (1).

8. An exterior automotive part showing excellent image clarity after coating, which is obtained by shaping a fiber-reinforced resin composition having surface smoothness, said resin composition comprising
   (1) 100 parts by weight of a thermoplastic resin composition comprising an aromatic polycarbonate resin and a thermoplastic polyester resin which is at least one member selected from the group consisting of poly(ethylene terephthalate), poly(butylene terephthalate), poly(ethylene naphthalate) and poly(butylene naphthalate) in a weight ratio of from 10/90 to 90/10, (2) from 5 to 100 parts by weight of glass fiber sheet chips having an almost rectangular shape, each side having a length of from 1 to 30 mm, the glass fiber sheet chips being obtained by forming E-glass fibers having an average fiber diameter of 2 $\mu$m or less which have been surface-treated with a silane coupling agent, into a sheet by a paper making process and then cutting the resulting sheet, and (3) from 0 to 40 parts by weight of a thermoplastic elastomeric polymer which is at least one member selected from the group consisting of an olefin-based copolymer, a polyurethane elastomer, a polyamide elastomer, a styrene/diene block copolymer, a methyl methacrylate-butadiene-styrene copolymer, a methyl methacrylate-acrylate-styrene copolymer, and an acrylic ester-based core-shell graft copolymer.

9. An exterior automotive part as claimed in claim 8, wherein the amount of said thermoplastic elastomeric polymer (3) is from 2 to 20 parts by weight per 100 parts by weight of the thermoplastic resin composition (1).

* * * * *